March 4, 1930.
E. A. ROCKWELL
MOTOR INDICATING SYSTEM
Re. 17,616
Original Filed March 3, 1924
2 Sheets-Sheet 1
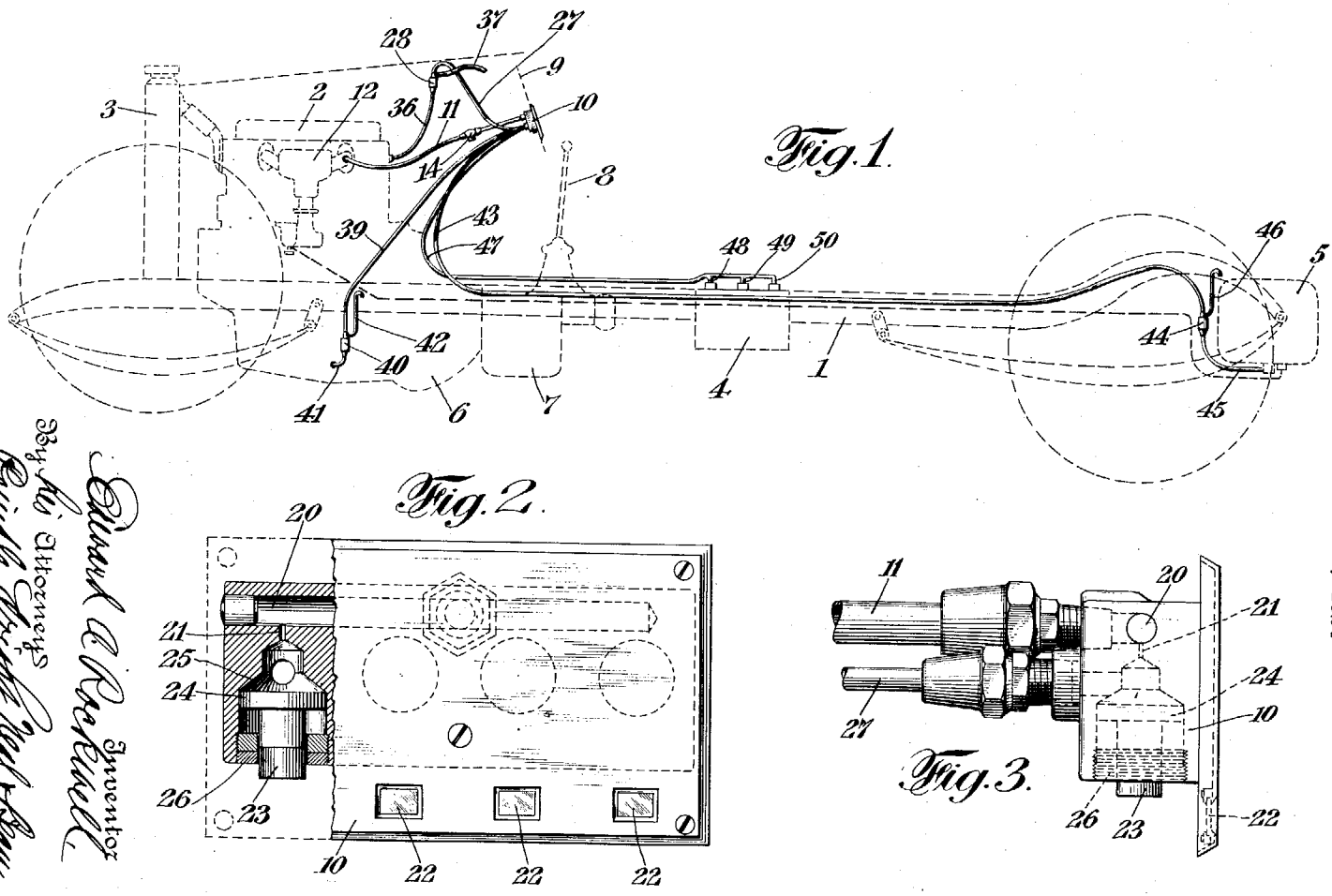
Inventor
Edward A. Rockwell
By his Attorneys
Priddy, Wright, Neal & Bean.

March 4, 1930.
E. A. ROCKWELL
MOTOR INDICATING SYSTEM
Re. 17,616
Original Filed March 3, 1924
2 Sheets-Sheet 2
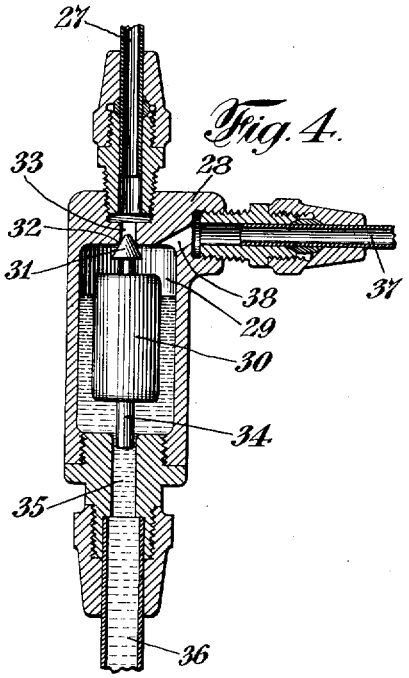
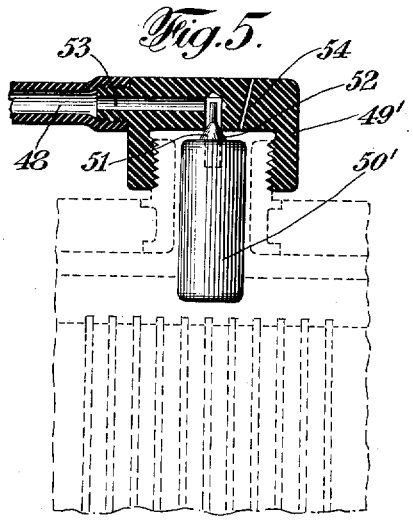
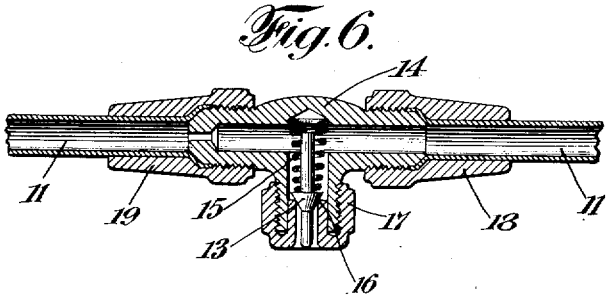
Inventor
Edward A. Rockwell,
By his Attorneys
Prindle, Wright, Neal & Beau.

Reissued Mar. 4, 1930

Re. 17,616

UNITED STATES PATENT OFFICE

EDWARD A. ROCKWELL, OF CHICAGO, ILLINOIS

MOTOR-INDICATING SYSTEM

Original No. 1,677,494, dated July 17, 1928, Serial No. 696,493, filed March 3, 1924. Application for reissue filed April 6, 1929. Serial No. 353,234.

My invention relates to an apparatus designed for indicating the status of different portions of motor and power units generally but it has relation especially to indicating the liquid levels in the various parts of an internal combustion engine equipment. It is of particular value in connection with automobiles as will be seen hereinafter.

The object of my invention is to provide an indicating system whereby the condition of the power unit may be readily determinable at all times. This is of particular advantage in the case of automobiles where it is desirable to know, as readily indicated by my device, the oil level, water level, gasoline level and battery fluid level. When apprised of these facts the motorist will know the condition of operation of his engine and what, if anything, is necessary for him to do concerning the proper supply and maintenance of the same. For example, if the water level is low, or the oil level is low, he will know that the engine will be in danger of overheating. Also, if the battery fluid is low, he will know that the battery needs refilling with water and is in danger of freezing in cold weather. The indicators for these various units are arranged in accordance with my invention in a place where they may be readily observed so that the motorist can tell at a glance what is necessary for him to do in connection with the car.

Further objects of my invention will appear from the detailed description thereof contained hereinafter.

While my invention is capable of many different forms for the purpose of illustration I have shown only one form thereof in the accompanying drawings in which—

Fig. 1 is a diagrammatic vertical elevation of an automobile equipped with my invention;

Fig. 2 is an elevation partly in section of the dash board instrument used in connection therewith;

Fig. 3 is a side elevation of the same;

Fig. 4 is a vertical section of one of the level controlled devices as, for example, a water indicating unit;

Fig. 5 is a vertical section of one of the battery indicating units; and

Fig. 6 is a vertical section of an air bleed valve controlling the degree of vacuum utilized in the apparatus.

In the drawings I have shown an automobile 1 having an engine 2 of internal combustion type connected with a radiator 3 for the water circulation therein with a battery 4 for supplying current thereto and with a rear fuel supply tank 5 for the liquid fuel. The engine 2 has the usual crank case 6, clutch 7 and clutch lever 8, the latter being located in the usual way immediately to the rear of a dash 9. The dash 9 is provided with an indicating instrument 10, one tube 11 of which is connected to an intake manifold 12 on the engine. The tube 11 between the dash 9 and the intake manifold 12 is equipped with an air bleed valve 13 located in a valve housing 14 and arranged to be pressed normally by spring 15 against a valve seat 16 carried by a screw-threaded venting cap 17 on the housing 14. Screw-threaded connections 18 and 19 connect the housing 14 in the tube 11. The tube 11 leads to a transverse passageway 20 in the instrument 10, having a plurality of downwardly directed restricted openings 21 equal in number to the number of indications to be given as to the liquid levels in the various parts of the engine equipment. As shown in Fig. 2 there may be four of these, if desired, to provide respectively for fuel level, water level, battery fluid level and oil level. For indicating the condition of each of these parts of the engine, the instrument is provided with a number of transparent windows 22, each of which is designed to display the presence or absence of a plunger 23 colored in a bright distinctive manner so that when the particular plunger is seen through its window it will indicate danger as to the particular unit requiring attention and when not being exhibited will indicate a normal condition of the operation of the particular unit. The position of the plunger 23 is determined by the vacuum applied through the passageways 20 and 21 inasmuch as the plunger 23 has at its upper end an enlarged portion 24 adapted to fit against a seat 25. A screw-threaded ring 26 retains the plunger 23 in place. The position of the plunger 23 above the ring 26 is determined by the presence or absence of a vacuum between the passageway 21 and the top of the plunger 23 through the presence of a tube 27 leading to the particular part of the engine equipment where the level is to be indicated. For this purpose I have provided such a tube for indicating the level of the water in the water cooling system of the engine. The tube 27 connects with a casing 28 having a liquid level chamber 29 provided with a float 30 therein having a valve 31 seating against a valve seat 32 in a passageway 33 leading to the tube 27. A stem 34 on the float guides it in a passageway 35 connected by a tube 36 to the water jacket of the engine. A venting tube 37 is connected by a passageway 38 to the chamber 29, the outer end of the venting tube 37 being above the highest actual liquid level of the water in the cooling system of the engine. In a similar way a tube 39 is provided for indicating the oil level in the crank case 6, said tube 39 leading to a float casing 40 constructed the same as to form and contents as in the case of the water level indicator above referred to except that the float therein will have an appropriate buoyancy in accord with the density of the oil while the casing 40 is connected by a pipe 41 to the crank casing 6 and the former has a venting tube 42 the same as in the case of the water level indicator. There is, furthermore, provided a tube 43 leading to a similar float casing 44 adjacent to the fluid supply tank to which it is connected by a tube 45 and which is provided, furthermore, with a venting tube 46. These parts are again constructed in the same way as the indicating means for the water level, except that the float in the casing 44 is provided with the buoyancy appropriate to the density of the liquid fuel. Again, there is a tube 47 having three branches 48, 49 and 50 leading respectively to the three cells of the battery 4. In this instance the level registering device is the same in each of the three cells of the battery, one of the cells being shown enlarged in Fig. 5, and connected to the tube 48. The tube 48 which may, if desired, be of rubber, is connected to a rubber cap 49′ screw-threaded to the top of the cell which may be provided with a float 50′ of bakelite or other acid-resisting material having a valve 51 therein operating with a seat 52 in a passageway 53 in the cap 49′. There is also provided a vent 54 to the outer air in the cap 49′. It will be understood that the battery 4 may be constructed in accordance with any design of battery required and may for example have the usual electrolyte containing dilute sulphuric acid.

In the operation of my invention it will be understood that the motorist can readily see the condition of his car by merely observing the windows 22 on the instrument located on the dash 9 inasmuch as by this means he can determine the water level, the oil level, the gasoline supply level and the battery liquid level at a glance. As above pointed out, these facts will be determinative of the condition of operation of the engine and when there is any indication of danger from any one of the windows 22, he will know the appropriate action to take in order to supply the engine needs, whatever they may be. The various indicating units operate in substantially the same manner. For example, in the case of the water level indicator, as long as the level is sufficiently high the float 30 will close the passageway 33, thus preventing access of air through the vent opening 38 and the plunger 23 will, therefore, be held upwardly above and away from the corresponding window 22. As soon as the liquid water level falls in the water jacket, however, and as a consequence within the casing 28, the air passing through the vent 38 into the tube 27 will break the vacuum above the plunger 23, thus allowing the same to fall where it may be seen through the window 22 so as to indicate danger concerning this particular part of the engine. Should at any time the vacuum in the tube 11 become excessive under certain conditions of operation of the engine, this excessive vacuum will not result in holding the plungers 23 against their seats when the respective units are vented inasmuch as the vent valve 13 will unseat to bleed in air and thus prevent the operation of any such excessive vacuum to the indicating means.

While I have described my invention above in detail I wish it to be understood that many changes may be made therein without departing from the spirit of the same.

I claim:

1. A level indicating device for internal combustion engines comprising an indicating means including a visible indicator, a connection from said means to a source of vacuum arranged to hold said indicator in non-indicating position by the vacuum, a level registering device positioned according to a liquid level in the engine equipment, a vacuum connection from the indicating means to the level registering device and a vent adapted to be thrown into and out of communication with the vacuum connection by the registering device according to the liquid level.

2. A level indicating device for internal combustion engines comprising an indicating means, a connection therefrom to a source of vacuum, a level registering device comprising a float adapted to assume a level corresponding to a liquid level of the engine, a vacuum connection communicating with the said source of vacuum and said level registering device and a vent adapted to be thrown into and out of communication with the vacuum connection by the registering device according to the liquid level.

3. A level indicating device for internal combustion engines comprising an indicating means comprising a vacuum-operated plunger, a connection therefrom to a source of vacuum, a level registering device positioned according to a liquid level in the engine equipment, a vacuum connection between the level registering device and the indicating means communicating with said first mentioned connection between the source of vacuum and plunger and a vent adapted to be thrown into and out of communication with the vacuum connection by the registering device according to the liquid level.

4. A level indicating device for internal combustion engines comprising an indicating means comprising a vacuum-operated plunger and a window, a connection from said means to a source of vacuum, arranged to hold said plunger away from the window by the vacuum, a level registering device positioned according to a liquid level in the engine equipment, a vacuum connection from the indicating means to the level registering device and a vent adapted to be thrown into and out of communication with a vacuum connection by the registering device according to the liquid level.

5. A level indicating device for internal combustion engines comprising an indicating means including a visible indicator, a connection from said means to a source of vacuum arranged to hold said indicator in non-indicating position by the vacuum, a level registering device positioned according to a liquid level in the engine equipment, a vacuum connection from the indicating means to the level registering device and a vent having an outlet above the highest liquid level adapted to be thrown into and out of communication with the vacuum connection by the registering device according to the liquid level.

6. A level indicating device for internal combustion engines, comprising an indicating means comprising a vacuum-operated plunger, a connection therefrom to a source of vacuum, a level registering device positioned according to a liquid level in the engine equipment, a vacuum connection between the level registering device and the indicating means communicating with said first mentioned connection between the source of vacuum and the plunger and a vent having an outlet above the highest liquid level adapted to be thrown into and out of communication with the vacuum connection by the registering device according to the liquid level.

7. A level indicating device for internal combustion engines comprising an indicating means comprising a vacuum-operated plunger, a connection therefrom to a source of vacuum, a level registering device comprising a float positioned according to a liquid level in the engine equipment, a vacuum connection between the level registering device and the indicating means communicating with said first mentioned connection between the source of vacuum and the plunger and a vent having an outlet above the highest liquid level adapted to be thrown into and out of communication with the vacuum connection by the registering device according to the liquid level.

8. A level indicating device for internal combustion engines comprising an indicating means comprising a vacuum operated plunger and a window, a connection from said means to a source of vacuum arranged to hold said plunger away from said window by the vacuum, a level registering device positioned according to a liquid level in the engine equipment, a vacuum connection from the indicating means to the level registering device and a vent having an outlet above the highest liquid level adapted to be thrown into and out of communication with the vacuum connection by the registering device according to the liquid level.

9. A level indicating device for internal combustion engines, comprising an indicating means, a connection therefrom to a source of vacuum, a level registering device comprising a float positioned according to a liquid level in a battery provided in the engine equipment, a vacuum connection communicating with the said source of vacuum and said level registering device and a vent adapted to be thrown into and out of communication with the vacuum connection by the registering device according to the liquid level.

10. A level indicating device for internal combustion engines, comprising an indicating means, a connection therefrom to a source of vacuum, a level registering device positioned according to a liquid level in each cell of a battery provided in the engine equipment, a vacuum connection communicating with the said source of vacuum and said level registering device and a vent adapted to be thrown into and out of communication with the vacuum connection by the registering device according to the liquid level, there being only one vacuum connection from the indicating means to the several battery cells.

11. A level indicating device for internal combustion engines, comprising an indicating means, a connection therefrom to a source of vacuum, a level registering device comprising a float positioned according to a liquid level in each cell of a battery provided in the engine equipment, a vacuum connection communicating with the said source of vacuum and said level registering device and a vent adapted to be thrown into and out of communication with the vacuum connection by the registering device according to the liquid level, there being only one vacuum connection from the indicating means to the several battery cells.

12. A level indicating device for internal combustion engines comprising an indicating means, a connection therefrom to a source of pressure differing from the atmospheric pressure, a level registering device comprising a float adapted to assume a level corresponding to a liquid level of the engine, a connection communicating with the said source and said level registering device and a vent adapted to be thrown into and out of communication with said connection by the registering device according to the liquid level.

13. A level indicating device for internal combustion engines comprising an indicating means, a connection therefrom to a source of fluid pressure differing from the atmospheric pressure, a level registering device comprising a float adapted to assume a level corresponding to a liquid level of the engine, a fluid connection communicating with the said source and said level registering device, and a vent adapted to be thrown into and out of communication with said connection by the registering device according to the liquid level.

14. A level indicating device for internal combustion engines comprising an indicating means, a connection therefrom to a source of pressure differing from the atmospheric pressure, a level registering device comprising a float adapted to assume a level corresponding to a liquid level of the engine, a connection communicating with the said source and said level registering device, and a passageway for altering the pressure, adapted to be thrown into and out of communication with said connection by the registering device according to the liquid level.

15. A level indicating device for internal combustion engines comprising an indicating means, a connection therefrom to a source of fluid pressure differing from the atmospheric pressure, a level registering device comprising a float adapted to assume a level corresponding to a liquid level of the engine, a fluid connection communicating with the said source and said level registering device, and a passageway for altering the pressure, adapted to be thrown into and out of communication with said connection by the registering device according to the liquid level.

16. A level indicating device for internal combustion engines comprising an indicating means, a connection therefrom to a source of pressure differing from the atmospheric pressure, a level registering device comprising a member adapted to have changes of buoyancy according to a liquid level located at a point remote from the indicating device and adapted to assume a level corresponding to a liquid level of the engine, and a connection communicating with said source and said level registering device so as to change the position of the indicating device according to the changes in pressure determined by the float.

17. A level indicating device for internal combustion engines comprising an indicating means, a connection therefrom to a source of pressure differing from the atmospheric pressure, a level registering device comprising a member adapted to have changes of buoyancy according to a liquid level and adapted to assume a level corresponding to a liquid level of the engine, and a connection communicating with said source and said level registering device being adapted to indicate the liquid level by means of said pressure acting in a manner dependent upon the buoyancy of the float.

18. A level indicating device for internal combustion engines, comprising an indicating means, a vacuum connection from the indicating means to an intake manifold of the engine, a level registering device comprising a member adapted to have changes of buoyancy according to a liquid level of the engine, a connection communicating with said source of vacuum and said member and a vent adapted to be thrown into and out of communication with said connection by the registering device according to the liquid level.

19. A level indicating device for internal combustion engines, comprising an indicating means adapted to register simultaneously the variations in levels respectively of a plurality of different liquids of the engine, and a single connection therefrom to a source of pressure other than that of the atmosphere for operating said indicating means.

20. A level indicating device for internal combustion engines, comprising an indicating means adapted to register the variations in levels of a plurality of different liquids of the engine, a single connection therefrom to a source of vacuum, a plurality of level registering devices comprising members adapted to have changes of buoyancy according to said liquid levels, connections communicating with said source and said level registering devices and vents adapted to be thrown into and out of communication with said connections by the registering devices according to the liquid levels.

21. In combination, a storage battery having a liquid filling opening and a battery liquid level indicating device, comprising an indicator, a level indication determining device including a connection from the indicator to a source of pressure differing from atmospheric pressure and a tubular means in communication with said connection extending from the battery, and adapted to be fastened on said opening and means to render the connection to the battery effective or ineffective according to the liquid level therein.

22. In combination, a storage battery having a liquid filling opening and a battery liquid level indicating device, comprising an indicator, a level indication determining device including a connection from the indicator to a source of pressure differing from atmospheric pressure and a tubular means in communication with said connection extending from the battery, and adapted to be fastened on said opening, a battery cap having a bent opening therein, and means to render the connection to the battery effective or ineffective according to the liquid level therein.

23. In combination, a storage battery having a plurality of cells and a battery level indicating means comprising an indicator, a single fluid conveying tube connected thereto having branches extending therefrom to a plurality of the cells, and means for producing an indication thereon through said tube responding to a change in the liquid level in said cells.

24. In combination, a storage battery having a plurality of cells and a battery level indicating means adapted to indicate the lowest level in the plurality of cells comprising an indicator, a single fluid conveying tube connected thereto having branches extending therefrom to a plurality of the cells, and means for producing an indication thereon through said tube responding to a change in the liquid level in said cells.

25. A level indicating device for internal combustion engines, comprising an indicating means adapted to register simultaneously the variations in levels respectively of a plurality of different liquids of the engine means extending from said indicating means to various bodies of liquid of the engine, and a single connection from said indicating means to a source of pressure other than that of the atmosphere for operating said indicating means.

26. A level indicating device for internal combustion engines, comprising an indicating means adapted to register the level of a liquid used in the engine, a vacuum connection from the indicating means to the engine manifold, and a single connection from the liquid level of the body of liquid used in the engine to said indicating means, including means for preventing the liquid from passing up through said connection during the operation of the indicating means.

In testimony that I claim the foregoing I have hereunto set my hand this 2nd day of April, 1929.

EDWARD A. ROCKWELL.